United States Patent [19]

Arnold

[11] 4,290,190

[45] Sep. 22, 1981

[54] METHOD AND APPARATUS FOR SPREADING STATOR WINDINGS

[75] Inventor: Richard B. Arnold, Fort Wayne, Ind.

[73] Assignee: Advanced Machine and Tool Corporation, Fort Wayne, Ind.

[21] Appl. No.: 124,323

[22] Filed: Feb. 25, 1980

[51] Int. Cl.³ .......................................... H02K 15/06
[52] U.S. Cl. ...................................... 29/596; 29/736; 72/61; 72/465
[58] Field of Search ................. 29/596, 736, 734, 732; 310/42; 72/58, 61, 465

[56] References Cited

U.S. PATENT DOCUMENTS 3,629,925 12/1971 Brown, Jr. et al. .............. 29/596 X
3,841,133 10/1974 Rice, Jr. ........................... 29/596 X

*Primary Examiner*—Carl E. Hall
*Attorney, Agent, or Firm*—Richard T. Seeger

[57] ABSTRACT

A releasable clamp holds a stator with a closed end turn while a resilient plug, covered with a rigid smooth walled sleeve, is inserted through the central opening of the stator to spread the winding at the closed end turn. The sleeve is then withindrawn, the stator is unclamped, and the plug is compressed to further speed the windings at the closed end, after which the plug is removed.

13 Claims, 8 Drawing Figures

METHOD AND APPARATUS FOR SPREADING STATOR WINDINGS

BACKGROUND OF THE INVENTION

1. Field of the Invention

This invention is in the field of electric motor stator manufacture and more particularly to forming and spreading the windings at an end of the stator to provide clearance for rotation of attachments to the motor rotor.

2. Description of the Prior Art

In electric motor manufacture, the motor stator is wound with wire, coated with insulation, to provide a field in the stator opening in which a rotor is mounted for rotation. Typically, the windings, or end turns, are such as to form a dome over one end of the opening, while the windings, or end turns, at the other end of the opening have been spread to permit access to the opening for insertion of a rotor into the opening. While there is sufficient clearance at the one end to insert a rotor shaft, through the center of the domed winding, in most applications it is necessary to fully spread the windings at the domed end in order to provide clearance for rotation of a fan, or other member, that is secured to the shaft at the domed end.

In prior art devices, a way in which the windings at the domed end are spread is to forcibly insert, from the other end, a resilient, cylindrical plug through the winding dome and then compress the plug along the axis of the opening to enlarge the plug diameter and further spread the windings until they are sufficiently deformed to provide the aforementioned clearance at the one end.

The plug material is typically rubber or a resilient plastic, such as urethane, and thus has a surface with a relatively high coefficient of friction. Upon forcible axial insertion of the plug into the domed winding, prior to plug compression, the windings are dragged in the direction of plug movement due to the frictional force with the plug surface and in the process the insulative coating on the windings is frequently broken, causing arcing and short circuits between the winding coils.

Further, during the axial compression of the plug, the plug bulges, increasing its diameter. As the compression progresses, the bulge diameter moves axially, causing outward abrupt bending of the clamped stator windings, further increasing the likelihood of breaking the insulative coating on the windings and shortening the wire height as it is being spread.

SUMMARY OF THE INVENTION

A stator clamp releasably holds the stator against movement. A resilient cylindrical plug is mounted at one end to an hydraulically actuated rod. A metallic cap, having a polished surface, is attached to the other end of the plug. The diameter of the cap is incrementally larger than the plug diameter, thus exposing an annular rim. The distal end or nose of the cap is rounded.

A tubular rigid metallic sleeve, having a polished, smooth surface is slidably movable over the plug until a sleeve end seats on the annular rim of the cap, at which position the outer surfaces of the cap and sleeve are flush, and the plug is completely covered. The rod is moved axially of and through the opening of the clamped stator, the nose end of the cap contacting the domed windings to gradually and increasingly displace the windings in an outward radial direction. As the rod movement continues, the sleeve contacts and slides past the windings until the plug is radially opposite the windings. The sleeve is then withdrawn from the plug, exposing the plug to the windings. The plug is thus placed in the desired axial position with little or no axial drag on the windings.

The stator is then unclamped so that it can float in an axial direction. The nose end of the cap is then forced in an axial direction towards the plug, compressing the plug and further spreading the windings. As the plug bulge diameter increases and moves axially, it carries the now floating stator with it, minimizing abrupt bending of the windings and minimizing insulation break and damage and shortening of the winding height. Alternatively, a variable force may be placed on the stator clamp during plug compression to correspondingly vary the winding height.

In addition, the axial position of the plug may be varied during plug compression to also control winding height.

It is therefore an object of this invention to provide a method and apparatus for efficiently spreading a stator winding with a minimum of winding and insulation damage.

Another object of this invention is to provide a stator winding, or end turn, spreading method and apparatus utilizing a resilient plug, and a smooth walled sleeve for covering the plug during plug insertion into the winding, the sleeve being withdrawn to expose the plug prior to plug compression.

A further object of this invention is to provide a method and apparatus for stator winding spreading wherein the windings are spread by compressing a resilient plug and the stator is unclamped or clamped with a variable force during plug compression, and the axial position of the plug is variable during plug compression to control winding height.

The above-mentioned and other features and objects of this invention and the manner of attaining them will become more apparent and the invention itself will be best understood by reference to the following description of an embodiment of the invention taken in conjunction with the accompanying drawings.

DESCRIPTION OF THE PREFERRED EMBODIMENT

Figure 1:
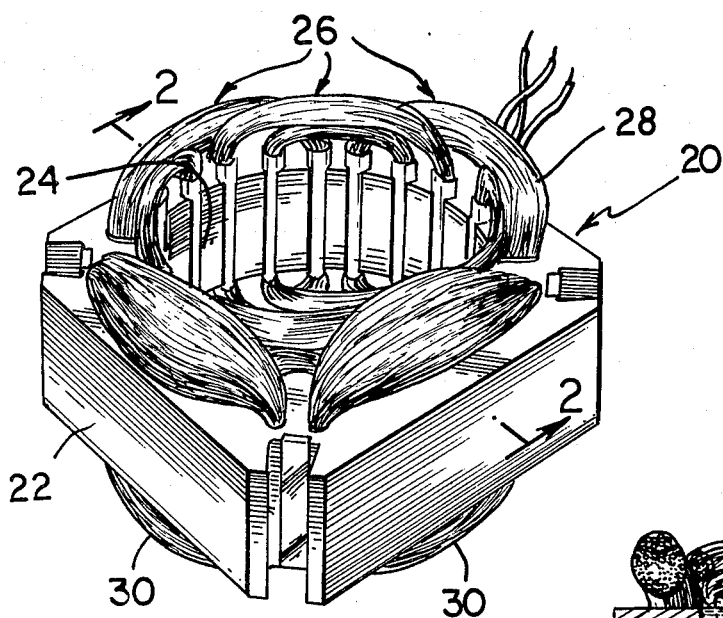
FIG. 1 is a view in perspective of a stator prior to the spreading of the windings.
Figure 2:
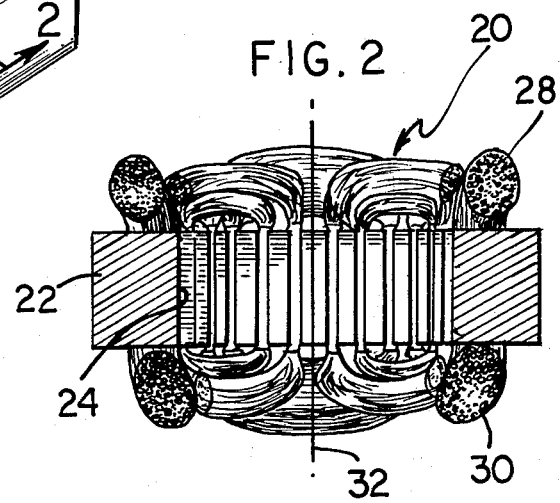
FIG. 2 is a section taken at 2—2 of FIG. 1.

Referring to FIGS. 1 and 2, a stator 20 has a square frame 22 with a slotted round opening 24 formed centrally thereof. Coils 26 of copper wire have a thin insulative coating and are wound in the slots of frame 22 in conventional manner and have end turn portion 28 extending above and end turn portion 30 extending below frame 22. Portion 28 is cylindrically shaped about axis 32 of opening 24 during the coil winding process to provide clearance for insertion of a rotor, not shown, while portion 30 is domed over opening 24. In numerous uses of stator 20, it is desirable to spread portion 30 from its domed shape to a cylindrical shape to provide clearance for a rotor attached fan or like member. This invention provides a method and apparatus to accomplish this objective.

Referring to FIGS. 3–7, base plate 36 is supported on a stand 38 of convenient height. A pair of spaced side plates 40, 42 are securely attached at their respective lower ends to base plate 36 and at their respective upper ends to top plate 44, as by threaded bolts screwed into tapped holes in the lower and upper edges of plates 40, 42, respectively. Back plate 46 is securely attached to the respective rear edges of plates 40, 42 as by threaded bolts screwed into tapped holes in plates 40, 42.

Elongated side rails 50, 52 are laterally spaced and attached, as by threaded bolts, in tapped holes in rails 50, 52, to side plates 40, 42, respectively. Rails 50, 52 are positioned in vertically spaced relation to base 36 and have longitudinal steps formed on their respective facing edges. Elongated guide rails 54, 56 are securely attached to the upper sides of rails 50, 52, respectively, and overlie their respective steps to form elongated longitudinal facing grooves 58, 60, respectively.

Square shaped stator holder 62 has round opening 64 formed centrally thereof and corners 65 formed equidistantly about opening 64. Ledges 66, 68 are formed on opposite edges of holder 62 and are slidably movable in grooves 58, 60, respectively. Piston rod 70 is secured to the rear edge of holder 62 and is reciprocally driven by an hydraulically operated piston-cylinder assembly 72 to move holder 62 between a loading station, FIG. 3, and rearwardly toward back plate 46 to a work station, FIGS. 4–7.

Planar clamps 76, 78 have clearance recesses 80, 82 formed on the inner edges thereof. Clamp 76 has openings 84, 86 for slidably receiving guide rods 88, 90, respectively, which are supported on their upper ends to guide block 92, and at their lower ends to side rail 50. Block 92 is securely attached at its outer edge to the inner side of plate 40 and extends inwardly therefrom. Rods 88, 90 have flats formed near their upper ends against which set screws 89, 91, respectively, are screwed to retain rods 88, 90 in block 92.

Piston rod 94 is secured at its upper end to collar 95, securely affixed to the underside of clamp 76 as by welding. Rod 94 is slidably received by opening 96 in side rail 50, and is reciprocably driven by pneumatically operated piston-cylinder assembly 98, securely attached to and depending from the bottom surface of rail 50. In like manner, clamp 78 has openings 100, 102 for slidably receiving guide rods 104, 106, respectively, which are supportedly attached at their upper ends to guide block 108 and at their lower ends to side rail 52. Block 108 is securely attached at its outer edge to the inner side of plate 42 and extends inwardly therefrom. Piston rod 110 is secured at its upper end to collar 111, affixed as by welding to the underside of clamp 78. Rod 110 is slidably received by opening 112 in side rail 52, and is reciprocably driven in synchronism with rod 94 by pneumatically operated piston-cylinder assembly 114, securely attached to and depending from the bottom surface of rail 52. Rods 104, 106 have flats at their upper ends against which set screws 105, 107, respectively, are screwed to retain rods 104, 106 in block 108.

Figure 4:
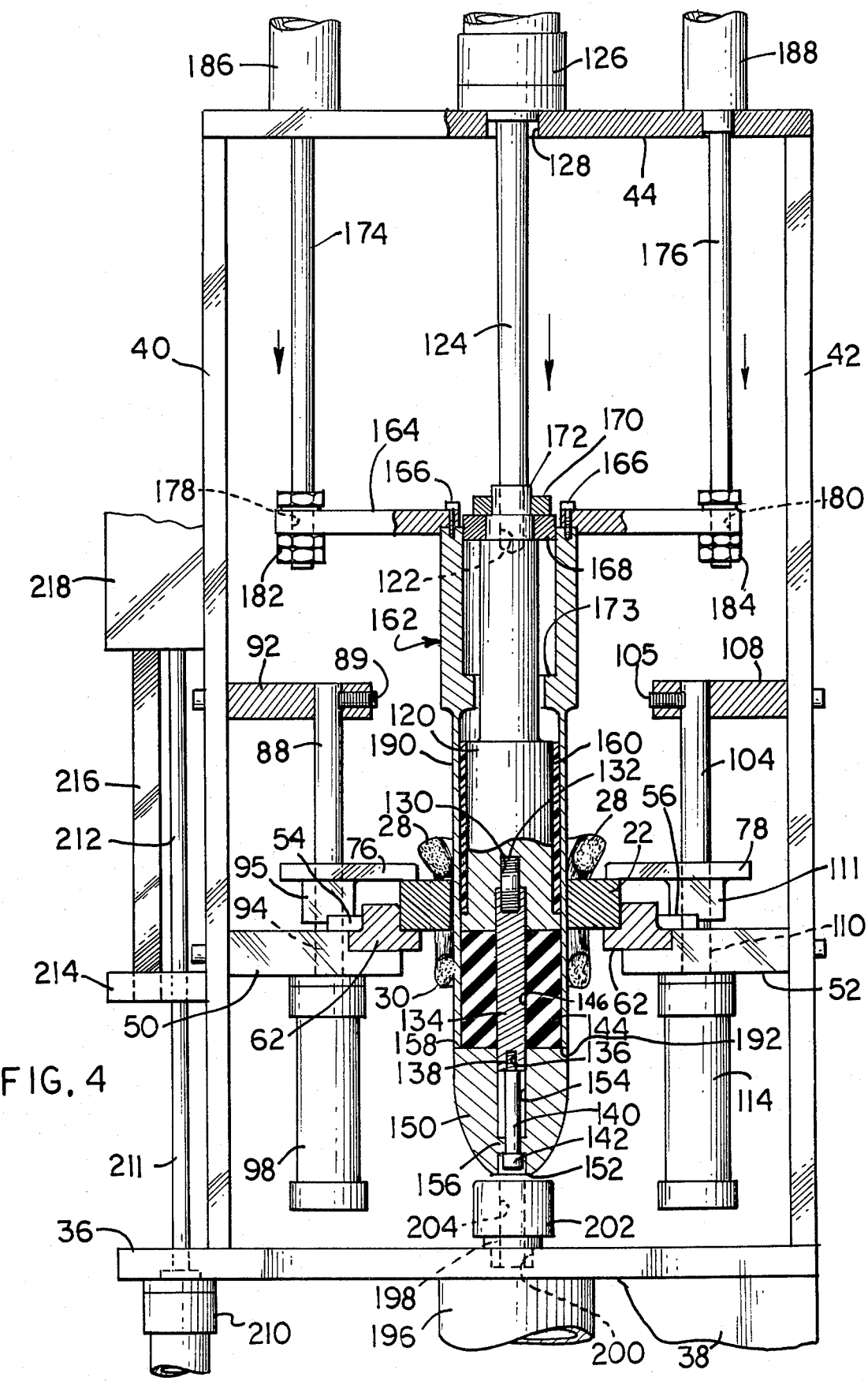
FIG. 4 is a partially sectioned partial side elevational view of the embodiment of FIG. 1.

Referring, in particular, to FIG. 4, elongated plug body 120 has a tapped socket 122 at its upper end into which is screwed the threaded lower end of piston rod 124, the upper end of which is reciprocably driven by hydraulically actuated piston-cylinder assembly 126, securely mounted to the upper side of top plate 44, above opening 128 through which rod 124 extends. The lower end of body 120 has a tapped socket 130 into which is screwed the threaded upper end of a dual threaded bolt 132, the lower threaded end of which is screwed into a tapped socket in the upper end of post 134. The lower end of post 134 has a tapped socket 136 into which is screwed the threaded end 138 of bolt 140 having enlarged heat 142. A resilient cylindrical plug 144, which may be of a urethane material, has a cylindrical passage 146 for slidably receiving post 134. The upper end of plug 144 abuts the lower end of body 120. A metallic cap 150, of case hardened cold rolled steel, has a rounded, downwardly facing nose with flattened end 152, and the outside surface of cap 150 is polished. Cap 150 has central axial bore 154 with an annular lip 156 which slidably receives bolt 140 and has a lower annular surface against which head 142 is abuttable. The diameter of cap 150, at its upper end, is slightly larger than that of plug 144, exposing an annular rim 158 for purposes later described. A lubricating bushing 160 is fitted and cemented about body 120 above plug 144 and may be of the kind commercially available under the trademark Olite, part no. AA-2605-5.

Figure 5:
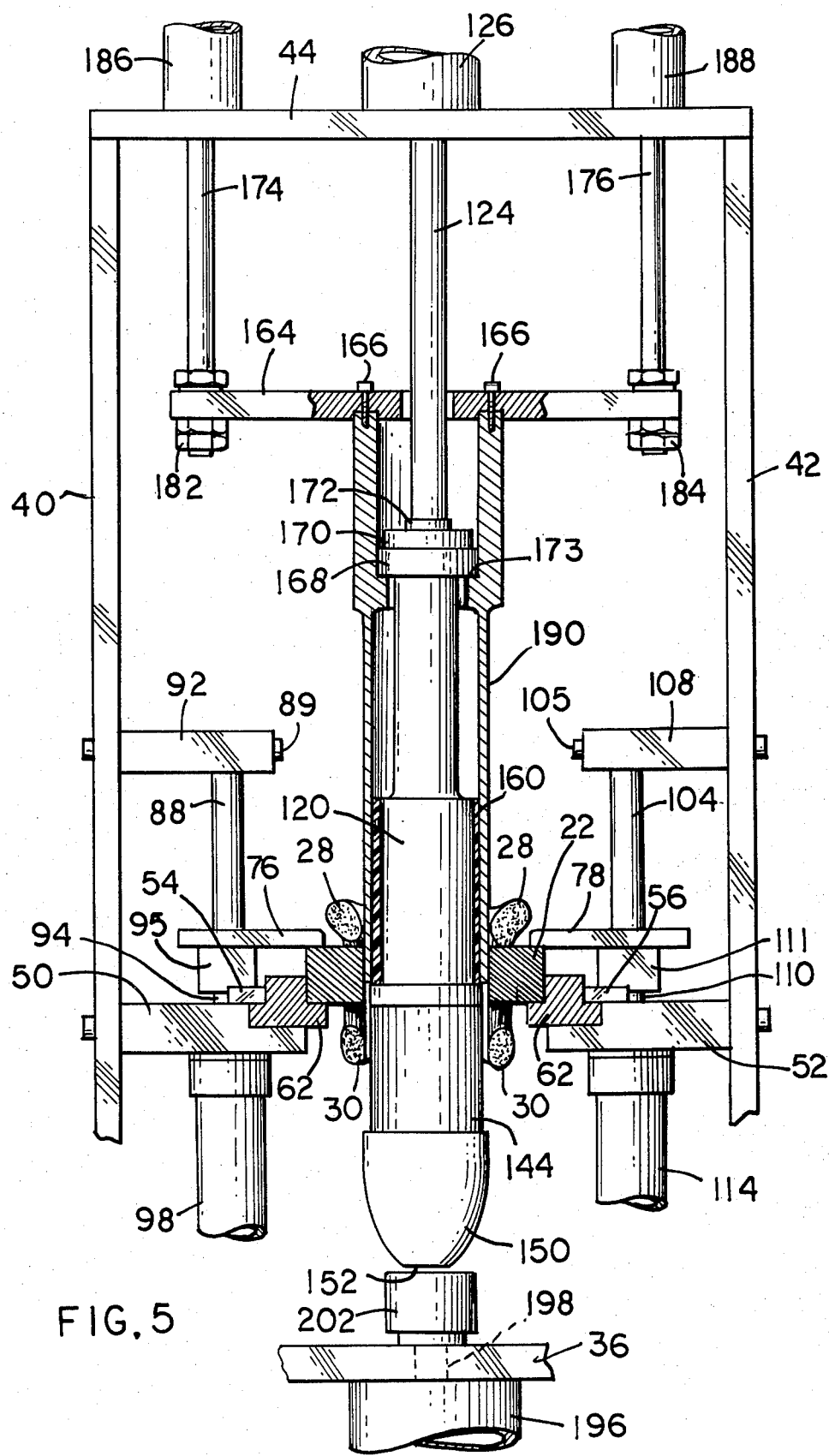
FIG. 5 is a partial view similar to FIG. 4 showing the raised position of the sleeve.
Figure 7:
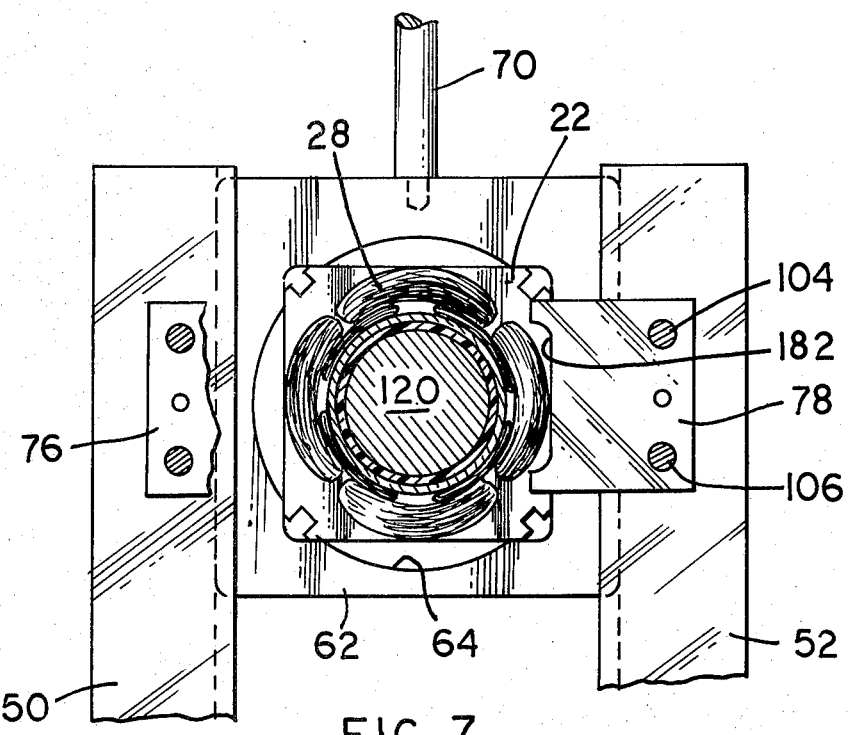
FIG. 7 is a partial section taken at 7—7 of FIG. 6, and is partially broken away.
Figure 6:
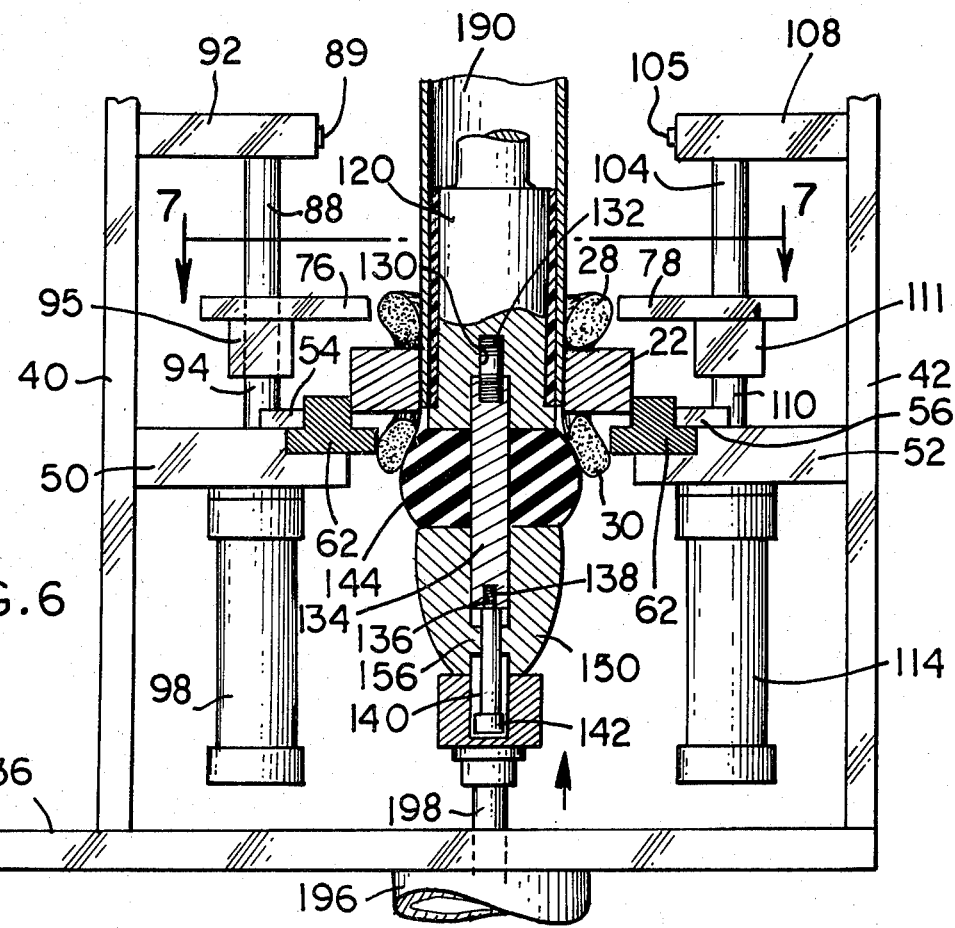
FIG. 6 is a partial view similar to FIG. 4 showing the compression of the resilient plug.

A sleeve 162 of cold rolled steel is chrome plated on its outside surface and securely attached at its upper periphery to plate 164 by threaded bolts 166 and is slidably engaged with guide ring 168 which is securely held to the upper end of body 120 by locknut 170 which is tightened against ring 168 on the threaded stub 172 of body 120. Annular ledge 173, formed intermediately on the inner wall of sleeve 162 is abuttable against the lower surface of ring 168 to define the upper limit of sleeve 162 travel, as shown in FIG. 5.

Plate 164 is securely attached to laterally spaced piston rods 174, 176, respectively, as by threaded engagement between the lower ends of rods 174, 176 and tapped holes 178, 180, and nuts 182, 184, respectively. Rods 174, 176 slidably extend through respective openings in top plate 44 and are reciprocably driven by pneumatically operated piston-cylinder assemblies 186, 188, respectively, which are securely attached to the upper side of top plate 44. Thus, simultaneous pneumatic actuation of assemblies 186, 188 will raise or lower plate 164 and sleeve 162.

The lower portion 190 of sleeve 162 has an outside diameter slightly less than the diameter of opening 24 and is polished on its outside surface and lower annular edge 192, of portion 190, seats against cap rim 158 when sleeve 162 is in its lowermost position, FIG. 4. The inner surface of portion 190 is slidable over bushing 160 and plug 144, bushing 160 providing lubricity for the sliding engagement.

Securely attached to the lower surface of base plate 36 is hydraulically activated piston-cylinder assembly 196 for reciprocably driving piston rod 198 slidably extending through opening 200. Cylindrical adapter 202 is securely attached to the upper end of rod 198, as by threaded engagement, and adapter 202 has a central bore 204 which can freely receive head 142 when rod 198 is urged upwardly, FIG. 6, forcing the upper end of adapter 202 against the lower end 152 of cap 150. Also, pneumatically operated piston-cylinder assembly 210 is securely attached to the lower surface of base plate 36 for raising and lowering rod 211 which is attached to and raises and lowers a transparent guard door 212, which may be made of tough, transparent material such as a plastic, sold under the trademark "Lexan", to permit loading of the stator 20 in holder 62 by selective raising of door 212. Door 212 is supported for vertical movement by bracket 214, rod 216, and housing 218.

Figure 8:
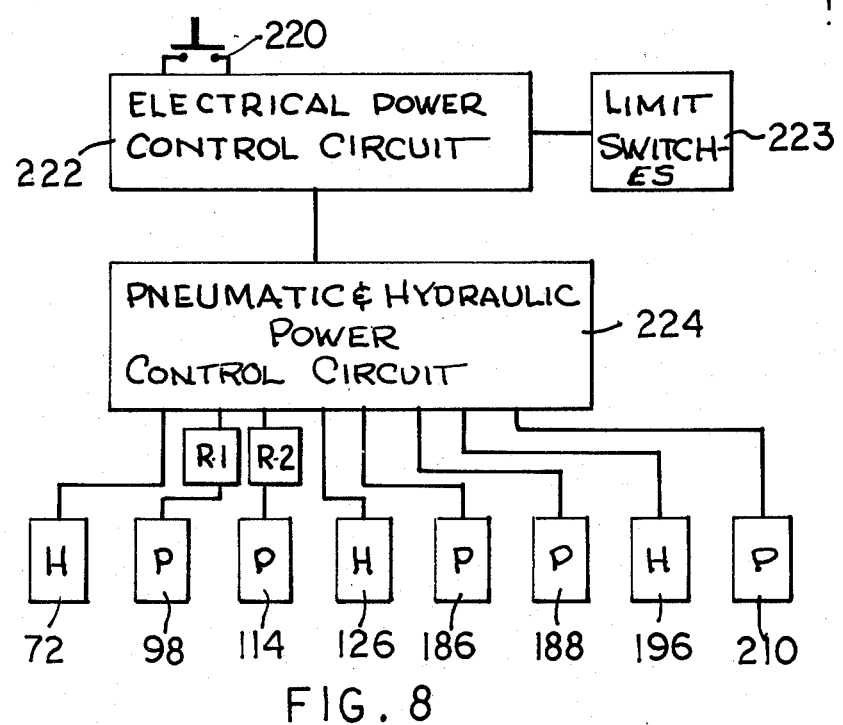
FIG. 8 is a block diagram of a power and control circuit for the winding spreading device.

Referring to FIG. 8, a block diagram of an electrical-pneumatic-hydraulic control circuit, for sequentially operating piston-cylinder assemblies 72, 98, 114, 126, 186, 188, 196, and 210 is shown. Manual operation of start button 220, of electrical power and control circuit 222, sets into operation sequential operation of the piston-cylinder assemblies. Limit switches 223 are provided in the embodiment of FIGS. 3–7 to provide position information of the moving parts to circuit 222 which then provides electrical signals for actuating valves, as by solenoids, in pneumatic and hydraulic power and control circuit 224, which is provided with a source of pneumatic and hydraulic pressure, to operate in proper sequence the piston-cylinder assemblies. Assemblies 72, 126, and 196 are hydraulically actuated and designated with the letter "H", while assemblies 98, 114, 186, 188, and 210 are pneumatically actuated and designated with the letter "P". Pressure regulators R-1, R-2 are placed in the lines to assemblies 98, 114, respectively, and may be set to adjust the release pressure of assemblies 98, 114 and thus adjust the clamping force of clamps 76, 78 on stator 20 during compression of plug 144. It is to be understood the piston-cylinder assemblies also can be manually operated in proper sequence in conjunction with conventional valving and power sources. In the operation description, which follows, the limit switches 223, which may be conventionally located and activated, will be referred to for providing the described sequencing of the piston-cylinder assemblies.

OPERATION

Figure 3:
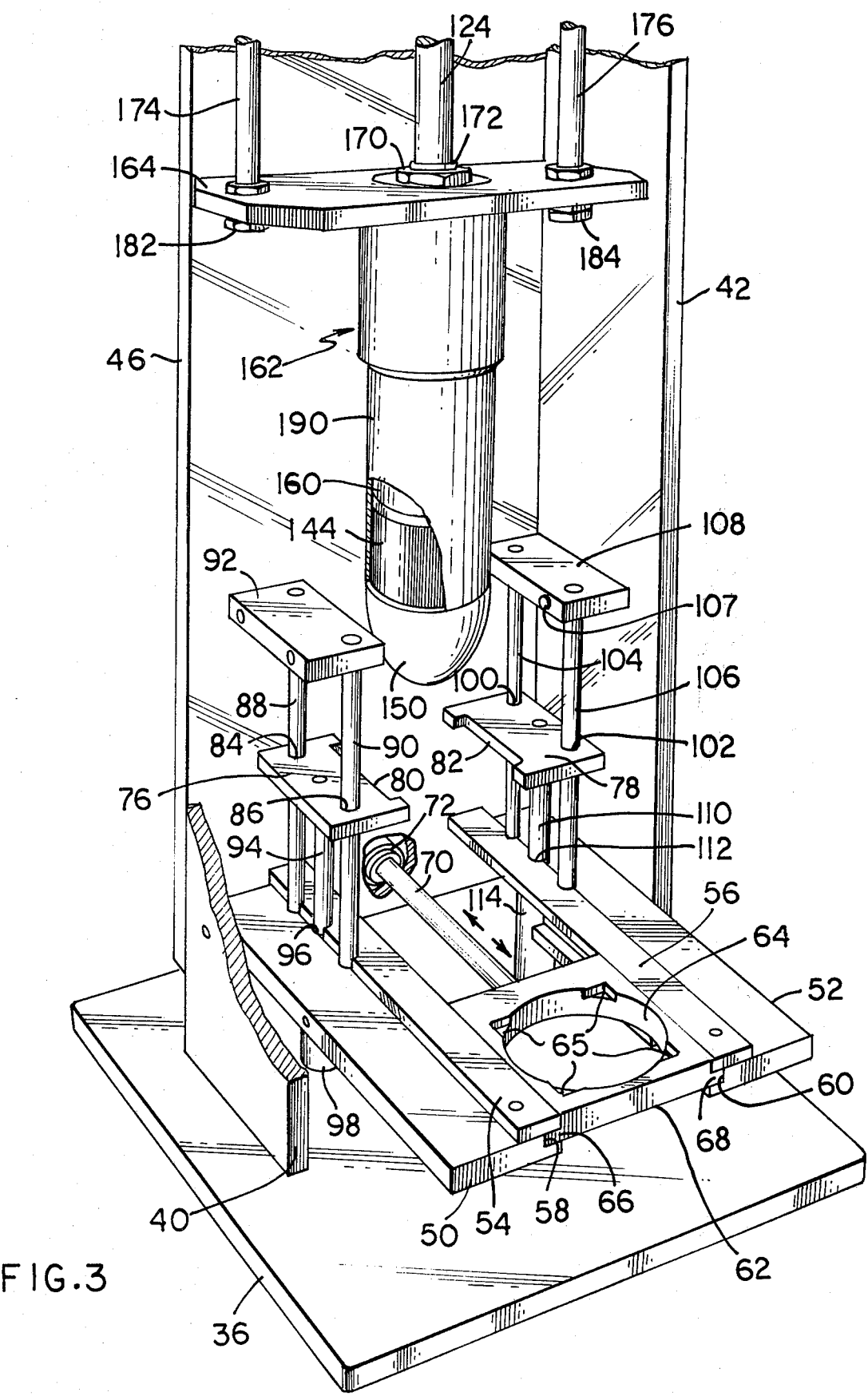
FIG. 3 is a partially broken away partial view in perspective of an embodiment of this invention.

Referring to FIGS. 4–7, in the start position, door 212 is open and stator 20 is placed in holder 62, in its extended loading position, shown in FIG. 3, with domed winding 30 being inserted in opening 64 and the corners of stator frame 22 being aligned with corners 65. Piston-cylinder assembly 72 is then actuated by pushing start button 220, actuating circuit 222 to provide an appropriate electrical signal to circuit 224 to hydraulically actuate assembly 72, withdrawing rod 70 and holder 62 into the rearward work station, FIGS. 4–7, directly beneath cap 150, holder 62 tripping a limit switch 223 to provide a signal from circuit 222, to circuit 224, to pneumatically operate assemblies 210, 98, and 114 to close door 212 and lower clamps 76, 78 from their raised positions to their lower positions, exerting a clamping force on frame 22 against holder 62.

Lowering of clamps 76, 78 trip limit switches 223, which actuate circuit 222 and provide a signal to circuit 224 to hydraulically actuate piston-cylinder assembly 126, lowering piston rod 124, and to pneumatically actuate piston-cylinder assemblies 186, 188 to lower rods 174, 176, respectively. Thus, plug 144 and cap 150 are lowered, plug 144 being fully covered by sleeve portion 190 during the lowering step, through end turn portions 28 and 30, spreading portion 30 as shown in FIG. 4.

Since cap 150 and sleeve portion 190 have polished metal surfaces, there is virtually no axial dragging of end turn portion 30 as the radial spreading takes place. After plug 144 is lowered to the position in FIG. 4, a limit switch 223 is tripped by the movement of plug 144 and cap 150 which actuates circuit 222 to provide a signal to circuit 224 to pneumatically actuate piston-cylinder assemblies 186, 188 to raise rods 174, 176, respectively, raising plate 164 and sleeve 162 to its upper position, FIG. 5, ledge 173 abutting ring 168, and exposing plug 144 to winding portion 30. The raising of plate 164 to its upper position trips a limit switch 223 to provide signals from circuit 222 to circuit 224 to pneumatically actuate piston-cylinder assemblies 98, 114 to raise rods 94, 110 and raise clamps 76, 78, respectively, permitting stator frame 22 to vertically "float". At the same time, circuit 222 provides a signal to circuit 224 to hydraulically actuate piston-cylinder assembly 196 to raise rod 198 causing adaptor 202 to forcibly abut cap 150, moving cap 150 upwardly on post 134, compressing and bulging plug 144, FIG. 6, which is held against upward movement since plug body 120 is held in place by piston-cylinder assembly 126.

Regulators R-1, R-2 may be adjusted to maintain a predetermined minimum pressure in assemblies 98, 114, respectively, during compression of plug 144 so that the stator 20 "float" is correspondingly restricted. This results in a predetermined shortening of stator winding height since, during plug 144 compression, end turns 30 will be forced upwardly toward frame 22.

Compression of plug 144 forces end turn portion 30 radially outwardly sufficiently to provide the desired stator core opening clearance. The compressive force exerted by clamps 76, 78 on frame 22 may be varied by adjusting regulators R-1 and R-2 to control the degree of the stator float during compression of plug 144 to adjust winding height. A minimum compressive force, or no compressive force, will maintain winding height and minimize possibility of damage to winding insulation. After bulging of plug 144, a limit switch 223 is tripped by movement of adaptor 202 and cap 150, causing assembly 196 to withdraw rod 198 and causing assembly 126 to raise rod 124, raising cap 150 and plug 144 and resetting sleeve 162 over plug 144 and tripping respective limit switches to actuate circuits 222, 224, and cause piston-cylinder assembly 72 to extend rod 70 and holder 62 to the loading position shown in FIG. 3. At that time, again through limit switch actuation, by the return of holder 62 to the loading position, door 212 is raised by pneumatic actuation of assembly 210 and stator 20 is unloaded from holder 62 and another stator is loaded into holder 62.

End turns 30 may also be extended away from frame 22 to increase stator winding 26 height. Body 120 is lowered as before. Adaptor 202 is then actuated and raised as before, compressing plug 144. Before adaptor 202 reaches its upper position, shown in FIG. 6, an additional limit switch 223 is tripped, causing circuits 222, 224 to stop further travel of adaptor 202 and to provide additional pressure to assembly 126 to lower rod 124 and body 120 an additional predetermined increment to complete the compression and bulging of plug 144 and at the same time forcibly extend end turns 30 below frame 22, which is supported on holder 62, to increase winding 26 height.

As previously mentioned, the above steps could be sequenced manually although conventional limit switch actuation is described and preferred. Pneumatic piston-cylinder assemblies are used where faster response and less pressure is desired, and hydraulic piston-cylinder assemblies are used where greater pressure and slower responses are desired. Also, the outer surface of plug 144 tends to become lubricated due to repeated sliding of sleeve portion 190 thereover, sleeve 190 having been previously lubricated by bushing 160, further lessening frictional drag on winding portion 30 during plug compression.

While there have been described above the principles of this invention in connection with specific apparatus, it is to be clearly understood that this description is made only by way of example and not as a limitation to the scope of the invention.

What is claimed is:

1. Stator winding spreading apparatus comprising:
first means for releasably clamping a stator having a cylindrical opening at a work station;
said stator having windings at least partially covering one end of said opening;
a resilient cylindrical plug;
a tubular cylindrical sleeve having a smooth surfaced outer wall and having an outside diameter that provides a sliding bit with said opening and an inside diameter that provides a sliding fit with said plug;
second means for moving said sleeve axially of said plug to a first axial position to cover said plug and withdrawing said sleeve to a second axial position to uncover said plug;
third means for inserting said plug covered by said sleeve axially into the other end of said stator opening to an axial position whereat said plug is radially opposite said windings;
fourth means to axially compress said plug whereby when said third means has inserted said sleeve and plug into said opening and said second means has withdrawn said sleeve, said fourth means compresses said plug to cause it to radially expand and force said windings radially outwardly to uncover said opening.

2. The apparatus of claim 1 with
fifth means for unclamping said stator during axial compression of said plug by said fourth means.

3. The apparatus of claim 1 including a cap having a smooth outer surface and being attached at one end to said plug and the opposite cap end being rounded to engage and gradually spread said windings as said third means inserts said plug and sleeve into said opening;
said cap having an exposed annular rim at one end on which said sleeve seats when said sleeve is in said first axial position, with the outer surface of said sleeve wall and said cap being substantially flush.

4. The apparatus of claim 1 including:
a stator holder for receiving and holding said stator;
sixth means for moving said holder from a stator loading station laterally removed from said work station to said work station and for laterally moving said holder from said work station to a said loading station whereby said stator is loaded into said holder at said loading station and moved to said work station for clamping said stator and after said clamping is released, said holder is moved to said loading station for stator removal from said holder.

5. Stator winding spreading apparatus comprising:
first means for releasably clamping a stator having a cylindrical opening; said stator having windings at least partially covering one end of said opening;
a resilient cylindrical plug;
second means for inserting said plug axially into the other end of said stator opening to an axial position whereat said plug is radially opposite said windings;
third means to axially compress said plug to cause it to radially expand and force said windings radially outwardly to uncover said opening; and
fourth means for at least partially unclamping said stator during axial compression of said plug by said third means.

6. The apparatus of claim 5 including fifth means for applying a variable clamping force to said stator during axial compression of said plug, by said third means, so that the axial height of said windings is variably controlled in accordance with said variable clamping force.

7. Stator winding spreading apparatus comprising:
first means for releasably clamping a stator having a cylindrical opening; said stator having windings at least partially covering one end of said opening;
a resilient cylindrical plug;
second means for inserting said plug axially into the other end of said stator opening to an axial position whereat said plug is radially opposite said windings;
third means to axially compress said plug to cause it to radially expand and force said windings radially outwardly to uncover said opening; and
fourth means for moving said plug a predetermined distance in an axial direction during axial compression by said third means so that the axial height of said windings is variably controlled in accordance with said predetermined distance.

8. A method of spreading the stator windings at least partially covering one end of a stator opening comprising the steps of:
clamping the stator against movement;
inserting axially of the opening a resilient plug covered with a smooth surfaced tubular sleeve into the other end of said opening of the clamped stator until the plug is radially opposite the winding at said one end;
withdrawing the sleeve from the plug exposing the plug to the winding;
axially compressing the plug to radially expand the plug and radially spread the winding;
decompressing and axially removing the plug from the opening.

9. The method of claim 8 having the additional step of unclamping the stator while axially compressing the plug, whereby said stator can axially float during the plug compression.

10. The method of claim 8 with the additional steps of laterally moving the stator from a loading station to an insertion station prior to clamping the stator and laterally moving the stator from the work station to an unloading station after decompressing and axially removing the plug from the stator opening.

11. A method of spreading the stator windings at least partially covering one end of a stator opening comprising the steps of:
applying a clamping force to the stator to hold the stator against movement;
inserting axially of the opening a resilient plug into the other end of said opening of the clamped stator until the plug is radially opposite the winding at said one end;

at least partially releasing said clamping force on the stator while axially compressing the plug to radially expand the plug and radially spread the winding;

decompressing and axially removing the plug from the opening.

12. The method of claim 11 with the additional step of applying a predetermined variable clamping force to said stator while axially compressing the plug to control the axial height of the windings in accordance with said predetermined clamping force, and decompressing and axially removing the plug from the opening.

13. A method of spreading the stator windings at least partially covering one end of a stator opening comprising the steps of:

applying a clamping force to the stator to hold the stator against movement;

inserting axially of the opening a resilient plug into the other end of said opening of the clamped stator until the plug is radially opposite the winding at said one end;

further axially inserting the plug a predetermined distance while axially compressing the plug to control the axial height of the windings in accordance with said predetermined distance; and decompressing and axially removing the plug from the opening.

* * * * *